(No Model.) 2 Sheets—Sheet 1.
W. T. LINTNER.
SPEED INDICATOR FOR SHAFTING.
No. 527,557. Patented Oct. 16, 1894.
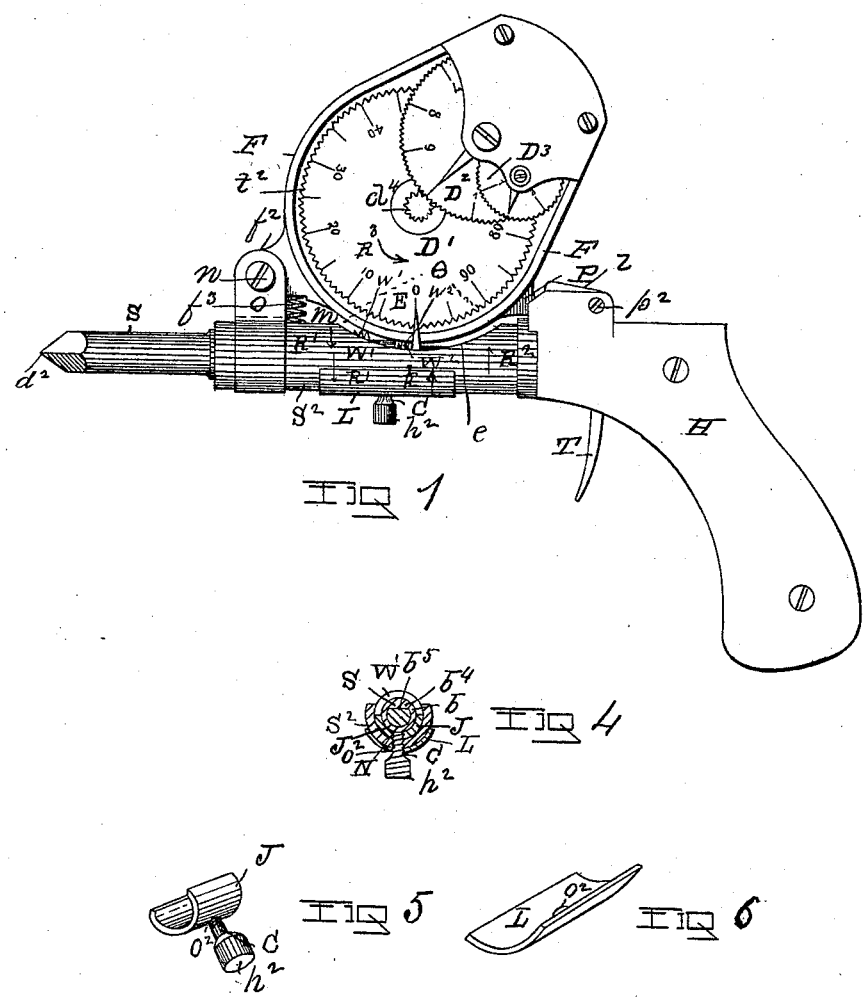
WITNESSES
Rufus M. Townsend
Charles S. Brintnall
INVENTOR
William T. Lintner
by W. E. Hagan atty

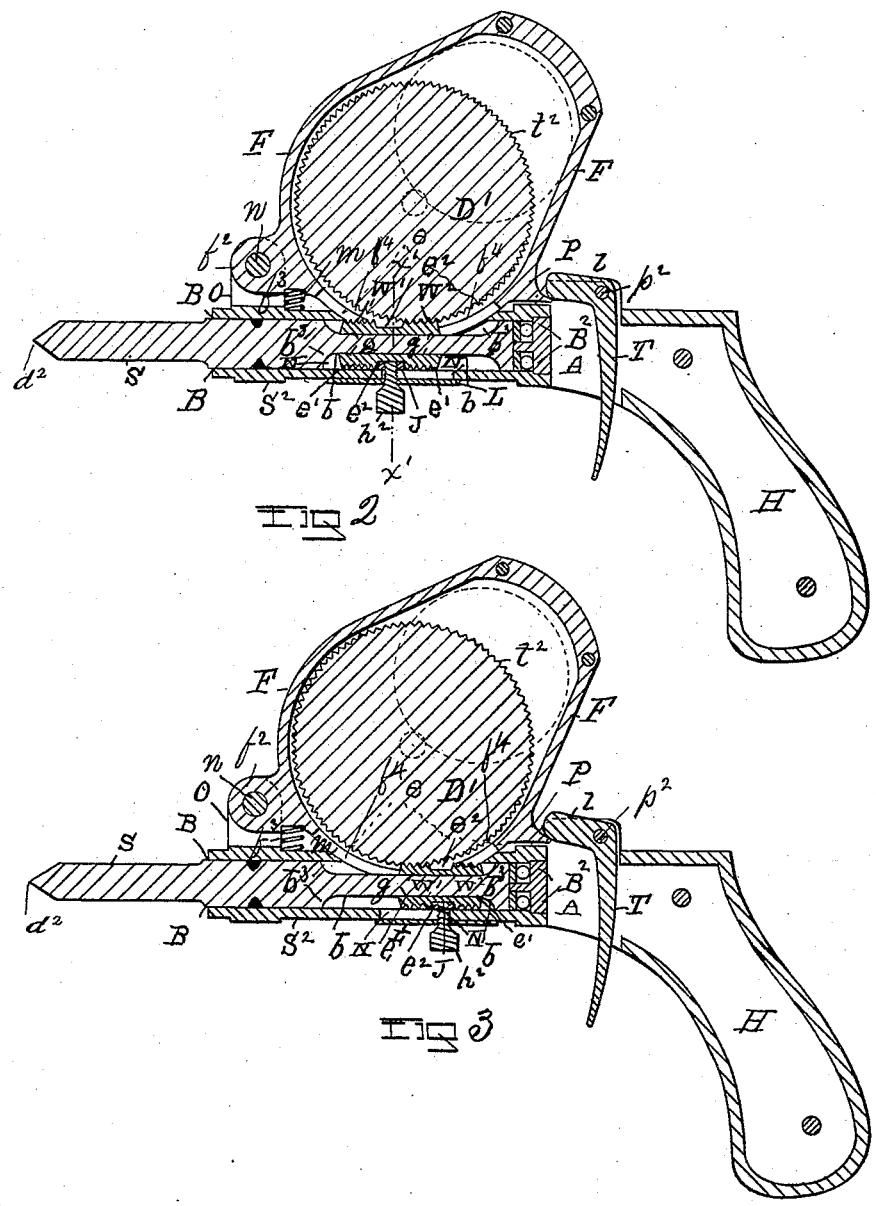

UNITED STATES PATENT OFFICE.

WILLIAM THOMAS LINTNER, OF GLOVERSVILLE, NEW YORK, ASSIGNOR OF ONE-HALF TO WILLIAM L. SPORBORG, OF SAME PLACE.

SPEED-INDICATOR FOR SHAFTING.

SPECIFICATION forming part of Letters Patent No. 527,557, dated October 16, 1894.

Application filed December 11, 1893. Serial No. 493,305. (No model.)

*To all whom it may concern:*

Be it known that I, WILLIAM THOMAS LINTNER, of the city of Gloversville, county of Fulton, and State of New York, have invented a new and useful Improvement in Speed-Indicators, of which the following is a specification.

My invention relates to improvements upon that class of devices which are used to determine the number of revolutions made by the revolving shafts or wheels; and which devices are termed speed indicators; and my improvements upon this class of apparatus as set forth herein, relate to their construction in such a manner that the indicating dial which having thereon figures designating the number of revolutions will be operated to turn in the same direction though actuated by oppositely revolving shafts.

My improvements upon this class of devices are shown as applied to the speed indicator illustrated and described in Letters Patent No. 508,686, granted to W. F. Dial, November 14, 1893, although it may be applied to any form of speed indicator wherein a contact spindle is made to operate a dial-wheel by means of a worm gear.

Accompanying this specification to form a part of it there are two plates of drawings containing six figures illustrating my invention, with the same designation of parts by letter reference used in all of them.

Of the illustrations Figure 1 is a side elevation of a speed indicator showing my improvement and invention as applied thereto. Fig. 2 is a central vertical section of the speed indicator illustrated at Fig. 1, said section being taken from end to end and illustrated with the rear one of the worm gears as moved outwardly, and in engagement with the perimetral teeth of the dial wheel. Fig. 3, is another section corresponding in all respects to that shown at Fig. 2, but with the outer one of the worm gears shown as having been moved inwardly, and in meshing engagement with the perimetral teeth of the dial wheel. Fig. 4 is a cross section taken on the line $x'$, $x'$, of Fig. 2. Fig 5 is a perspective of the slide-plate and grasping pin by which the worm gears and sleeve on which they are formed are moved outwardly and inwardly on the spindle. Fig. 6 is a perspective of the sliding cover plate with the grasping pin removed.

The several parts of the speed indicator illustrated, as well as the parts containing my improvement are designated by letter reference and the function of the parts is described as follows:

The letter S designates the spindle made with a bearing B, and an end ball bearing $B^2$, formed in the stock $S^2$, in which and against which bearings the spindle can turn, by causing the contact end $d^2$ to engage under pressure with the end of a revolving shaft. This stock is cut away upon its upper face in an arc-form at $e$, and has a pistol-form handle H, by which it is grasped for use.

The letter F designates a frame which at $f^2$ is made to tongue into an offset O, projected from the stock $S^2$, and pivoted therein at $n$, and the letter $m$ designates a spiral spring arranged between the frame at $f^3$ and the stock $S^2$. This frame F is slotted at its bottom $f^4$, and has journaled centrally within it, the dial-wheel D', having perimetral teeth or gears $t^2$; with this wheel so arranged within the frame F, that the lower edge of it will extend below the frame edge in the slot $f^4$.

The letter P designates a projection formed on the side of the frame F, and T a trigger form-lever which is arranged within a slot A, made in the stock longitudinally, with said lever therein pivoted at $p^2$, with its upper L-form end resting upon the top of the frame projection P; so that as thus constructed when the trigger-form lever T, is pulled rearwardly its upper L-form end will engage with the projection P, and pull down the frame on its pivoted connection to enter the arc-form recess $e$, in the stock, and the teeth of the dial-wheel D', where projecting through the frame at $f^4$, will engage with either of the worm gears, as either may be in position. The dial-wheel D' designates tens of revolutions and by means of a pinion $d^4$, communicates motion to a dial-wheel $D^2$, designating hundreds of revolutions, and the latter dial-wheel operates the dial-wheel $D^3$, indicating thousands of revolutions.

All the before named parts independently of their co-operation and combination with a two-part worm gear on the spindle are hereby disclaimed.

The letters $b$, designate a recess that is formed in revolution upon the spindle S, by which the latter is reduced in diameter between the shoulders $b^3$; and the letter $g$, designates a sleeve arranged on said spindle adapted to slide thereon between the shoulders, and constructed to turn with said spindle by means of a flat key-face $b^4$, made on the inner surface of the sleeve, and a correspondingly flat key face $b^5$, made on the outer face of the spindle-part $b$, as indicated at Fig. 4.

The letters W′ and W² designate two worm gears, one having a right hand, and the other a left hand thread, each of which are secured to one of the ends $e'$, of the sleeve $g$, but so as to leave an intermediate space $e^2$, between said worm gears.

The letter J designates a semi-tube-form plate arranged on the spindle-part $b$, between the worm gears, and in which plate the spindle may turn.

The letter N designates a slot made longitudinally in the bottom of the stock, and C a pin that is passed through a hole $O^2$, in the cover plate L, the latter having a contour in cross-section corresponding to the under-surface of the stock $S^2$, and this pin after passing through this cover plate is screwed into the plate J, so as to be securely attached thereto.

The letter $h^2$ designates a head formed on the pin C, for grasping and moving it. As thus constructed and connected, when the pin C is moved back and forth in the slot N, the sleeve $g$, and the worm gears are moved back and forth, with the sleeve adapted to turn in the plate J, by which in connection with the pin C, it is operated. As thus actuated either of the worm gears may be positioned so as to mesh into the perimetral gears of the dial-wheel D′.

To have the dial-wheel register from 0 upwardly in amounts from the pointer E, and have the dial-wheel move in the same direction with the spindle operated in opposite direction, there are arranged on the stock, arrows R′ and R², pointing oppositely, and these arrows R′ and R², on the cover-plate L, also pointing oppositely, with the direction of the arrows on the latter at each end corresponding to that of the arrows on the stock. These arrows indicate by their direction which of the worm gears must be brought into meshing engagement with the dial-wheel D′, to have the latter move in the proper direction to register. Thus with the shaft to be tested turning in the direction indicated by the arrow R′, on the stock, the cover-plate L, sleeve $g$, and worm gears W′, and W², are moved on the spindle so as to bring the worm gear W′, in meshing engagement with the dial-wheel D′, as shown at Fig. 2, which will cause the dial-wheel to move in the direction of the arrow R³, upon the dial-wheel. When the revolution of the shaft to be tested is moving in the direction of the arrow R², on the stock, the sleeve, worm gears and plate J, are moved by the pin C to bring the worm gear W² into a position to engage with the teeth of the dial-wheel D′, as shown at Fig. 3, and this worm gear having an opposite thread will move the dial-wheel in the same direction as the worm gear W′, although the shaft operating the spindle moves in a direction opposite to that when the worm gear W′, was acting.

As thus made and arranged to be operated the dial-wheels move in the same direction when recording the revolutions made by oppositely revolving shafts. This prevents mistakes in reading the revolutions recorded, and does away with the necessity of two sets of figures in the dials and the moving of the latter with opposite rotation to record the revolution of oppositely revolving shafts.

Having thus described my invention, what I claim, and desire to secure by Letters Patent, is—

1. In a speed indicator the combination with a spindle adapted to make a contact engagement with a revolving shaft, and to be turned with and by the latter; of a right hand and left hand threaded worm gear, each mounted upon, adapted to slide together upon, and to turn with said spindle; and a dial-wheel having perimetral teeth adapted to engage with and be operated to turn by either of said worm gears, substantially in the manner as and for the purposes set forth.

2. In a speed indicator the combination with a spindle adapted to engage with a revolving shaft, and be turned by the latter; of a sleeve mounted on said spindle, to turn with the latter, and to slide thereon longitudinally; a left-hand threaded worm-gear upon one end of said sleeve; a right-hand threaded worm-gear upon the other end of said sleeve, and a dial-wheel having perimetral teeth adapted to engage with, and be operated by either of said worm-gears, substantially in the manner as and for the purposes set forth.

3. In a speed indicator the combination with a spindle constructed to make a contact engagement with a revolving shaft, and actuated to be turned thereby within a stock, of a sleeve arranged on said spindle and constructed to slide longitudinally thereon and to turn therewith; of a right-hand threaded worm-gear upon one end of said sleeve; a left-hand threaded worm-gear upon its other end; a semi-tube form plate on said spindle between said worm-gears, and a pin connected to said plate by which the latter and the sleeve may be moved laterally on said spindle, substantially in the manner as and for the purposes set forth.

4. In a speed indicator the combination with a dial-wheel having perimetral teeth, and mounted in a frame that is pivoted to a stock; of a spindle arranged in bearings in the latter, and adapted to be turned when in contact with a revolving shaft; of a right-hand and left-hand threaded worm-gear mounted upon said spindle, and each of said worm-gears adapted to separately engage with the teeth upon said dial-wheel, substantially in the manner as and for the purposes set forth.

5. In a speed indicator the combination with a spindle constructed with bearings in a stock and adapted to engage with and be turned by contact with a revolving shaft, and provided with a right-hand and a left-hand threaded worm-gear, laterally adjustable on said spindle, substantially as described; of arrows on the stock indicating by direction the rotation of the shaft to which the spindle is to be applied; a dial-wheel mounted in a frame and having perimetral teeth adapted to engage with either of said worm-gears when positioned in the spindle with reference to said direction arrows, substantially in the manner as and for the purposes set forth.

6. In a speed indicator the combination with a spindle constructed with bearings in a stock and adapted to engage with and actuated to turn by a revolving shaft and provided with a right-hand and left-hand threaded worm-gear laterally adjustable on said spindle; of arrows on the stock indicating by direction the rotation of the shaft to which the spindle is to be applied; a dial-wheel mounted in a frame and having perimetral teeth adapted to engage with either of said worm-gears; a cover-plate adapted to move laterally with said worm-gears, said cover-plate having an arrow at each end pointing in coincident direction with those upon the stock, substantially in the manner as and for the purposes set forth.

Signed at Gloversville, New York, this 25th day of July, 1893, and in the presence of the two witnesses whose names are hereto written.

WILLIAM THOMAS LINTNER.

Witnesses:
DAN ROBINSON,
H. M. FITCH.